US007006673B2

(12) United States Patent
Hamid (10) Patent No.: US 7,006,673 B2
(45) Date of Patent: Feb. 28, 2006

(54) METHOD OF HASH STRING EXTRACTION

(75) Inventor: Larry Hamid, Ottawa (CA)

(73) Assignee: Activcard Ireland Limited, (IE)

( * ) Notice: Subject to any disclaimer, the term of this patent is extended or adjusted under 35 U.S.C. 154(b) by 625 days.

(21) Appl. No.: 09/911,743

(22) Filed: Jul. 25, 2001

(65) Prior Publication Data
US 2003/0091218 A1 May 15, 2003

(51) Int. Cl.
*G06K 9/00* (2006.01)
(52) U.S. Cl. ............... 382/124; 382/125; 340/5.53; 340/5.83; 713/186
(58) Field of Classification Search ........ 382/115–116, 382/124–127; 340/5.22, 5.23, 5.26, 5.52, 340/5.53, 5.82, 5.83, 5.54; 356/71; 902/3; 713/182, 185–186
See application file for complete search history.

(56) References Cited

U.S. PATENT DOCUMENTS

| 4,325,570 A | | 4/1982 | Estrada | |
| 4,817,183 A | | 3/1989 | Sparrow | |
| 5,999,637 A | * | 12/1999 | Toyoda et al. | 382/124 |
| 6,035,398 A | * | 3/2000 | Bjorn | 713/186 |
| 6,041,133 A | * | 3/2000 | Califano et al. | 382/124 |
| 6,185,318 B1 | | 2/2001 | Jain et al. | |

FOREIGN PATENT DOCUMENTS

| WO | WO 00/51244 A1 | 8/2000 |
| WO | WO 00/60533 A1 | 10/2000 |

OTHER PUBLICATIONS

Moayer et al., "A Syntactic Approach to Fingerprint Pattern Recognition", Pattern Recognition, Pergamon Press Inc., Elmsford, New York, USA, vol. 7, pp. 1-23, XP000199443, 1975.

* cited by examiner

*Primary Examiner*—Bhavesh M. Mehta
*Assistant Examiner*—John B. Strege
(74) *Attorney, Agent, or Firm*—Woodcock Washburn LLP (57) ABSTRACT

A method of hash string extraction from biometric information is disclosed. The method comprises the steps of providing a biometric information sample in the form of a fingerprint for example, extracting features from the biometric information sample and encoding the features based on their location within the biometric information sample; and, generating a string of values based on the extracted features and their determined locations. The method further comprises the steps of hashing the string of symbols to produce a plurality of hash values for comparing the plurality of hash values against a stored hash value for identifying a user.

12 Claims, 11 Drawing Sheets

METHOD OF HASH STRING EXTRACTION

The present invention relates to a method of generating biometric keys and more particularly to string extraction or string generation of values characteristic of biometric information.

BACKGROUND OF THE INVENTION

Security is fast becoming an important issue. Is has always been an issue for everybody to protect his belongings. It is also well known that with the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten, as users have no reliable method of remembering them. Writing down the codes and storing them in close proximity to an access control device (i.e., the combination lock) results in a secure access control system with a very insecure code. Alternatively, the nuisance of trying several code variations renders the access control system more of a problem than a solution.

Password systems are known to suffer from other disadvantages. Usually, a user specifies passwords. Most users, being unsophisticated users of security systems, choose passwords, which are relatively insecure. As such, many password systems are easily accessed through a simple trial and error process. It is well known to those skilled in the art that a security access system that provides substantially secure access and does not require a password or access code is a biometric identification system. A biometric identification system accepts unique biometric information from a user and identifies the user by matching the information against information belonging to registered users of the system. As a matter of fact, the ultimate method of personal identification is not a card, which can be lost, loaned or stolen, nor a number code, which can be discovered; but an unchangeable, non-transferable and indisputably unique characteristic of the person himself, in the form of biometric information such as a fingerprint. Fingerprint sensing and matching is a reliable technique for personal identification and/or verification.

In a fingerprint input transducer or sensor, the finger under investigation is usually pressed against a flat surface, such as a side of a glass plate; the ridge and valley pattern of the finger tip is sensed by a sensing means such as an interrogating light beam.

Today, fingerprint characterization is well known and can involve many aspects of fingerprint analysis. U.S. Pat. No. 4,353,056 in the name of Tsikos issued Oct. 5, 1982, discloses a fingerprint sensor that uses a capacitive sensing approach. Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404.

Even though the use of fingerprint identification devices increases the security in controlling more tightly building-access or information-access of individuals to buildings, rooms, and devices such as computer terminals, they are not one hundred percent flawless. Indeed, it is known that the biometric identification process of providing enrolment samples, characterization of the samples and storage in a template associated with the sample for future comparisons results in different enrolment templates for a same person when repeated. Depending upon the result of the comparison between a fingerprint and a template associated with the samples of the fingerprint, a user is identified or is rejected. It is understandable that with such a system, one fingerprint used for identifying an individual, the rate of false rejection and/or false acceptance is dependent upon the chosen algorithm and upon a quality of the provided fingerprint for use with the algorithm.

Furthermore, enrolment biometric templates must be stored in a computer system and must be accessible for allowing comparison with a newly provided fingerprint imaged by the biometric device; if the level of security and accuracy in the identification process is enhanced, further templates associated with further samples associated with the same individual must also be stored. More importantly, a newly provided fingerprint image is substantially different than the enrolment sample images because the position of the fingertip on the platen of a fingerprint imager or the pressure applied thereon is slightly different from application to application.

Finally, once a user is identified, the system retrieves from memory a password associated with the identification for provision to an application. The password so retrieved is subject to security attacks and might be detected because it is stored somewhere on the system itself or transmitted between systems.

OBJECT OF THE INVENTION

It is an object of this invention to provide a method for generating a string characteristic of biometric information.

SUMMARY OF THE INVENTION

In accordance with a preferred embodiment of the present invention, there is provided a method of string extraction from biometric information comprising the steps of:
  providing a biometric information sample;
  extracting features from the biometric information sample and encoding symbols indicative of characteristics of the features; and,
  generating a string of the symbols indicative of the extracted features.

In accordance with another preferred embodiment of the present invention, there is provided a method of string extraction from biometric information for authorizing access comprising the steps of:
  providing a biometric information sample to a contact imager for imaging the biometric information sample wherein the contact imager comprises a platen disposed for accepting a biometric information source thereon;
  processing the imaged information by extracting features therefrom and encoding symbols based on at least an extracted feature location within the biometric sample;
  comparing a string of symbols generated from an enrollment sample and a string of symbols generated from the imaged information of the biometric sample to determine a match, wherein upon a match access is provided.

In accordance with yet another preferred embodiment of the present invention, there is provided a method of password generation comprising the steps of providing a biometric information sample; determining from the sample a first string including a plurality of symbols, the symbols based on features within the biometric information sample; determining a plurality of strings in dependence upon predetermined characteristics in relation to the first string; hashing the strings from the determined plurality of strings to produce a plurality of hash values; and comparing each hash value from the plurality of hash values against a stored hash value determined during an enrollment process for determining at least one hash string from the plurality of hash strings indicative of a match, wherein upon a match between at least one hash value from the plurality of hash values and the stored hash value, the string from the plurality of strings and associated with the matching hash value is the generated password.

Advantageously, the invention provides a method of string extraction from biometric information that takes into consideration that an individual prompted to provide a fingerprint does not position his fingertip at the exact same location and does not apply the exact same pressure on the platen of the fingerprint imager. Furthermore, here is provided a method that does not necessitate the storage of templates against which a fingerprint is compared. Here is also provided a method of generating a string from biometric information that does not involve an association of a fingerprint with a stored password; here is also provided a method of generating a hashed string from biometric information that takes into consideration that a few features extractable from a fingerprint image may be absent in some images of a same fingerprint.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
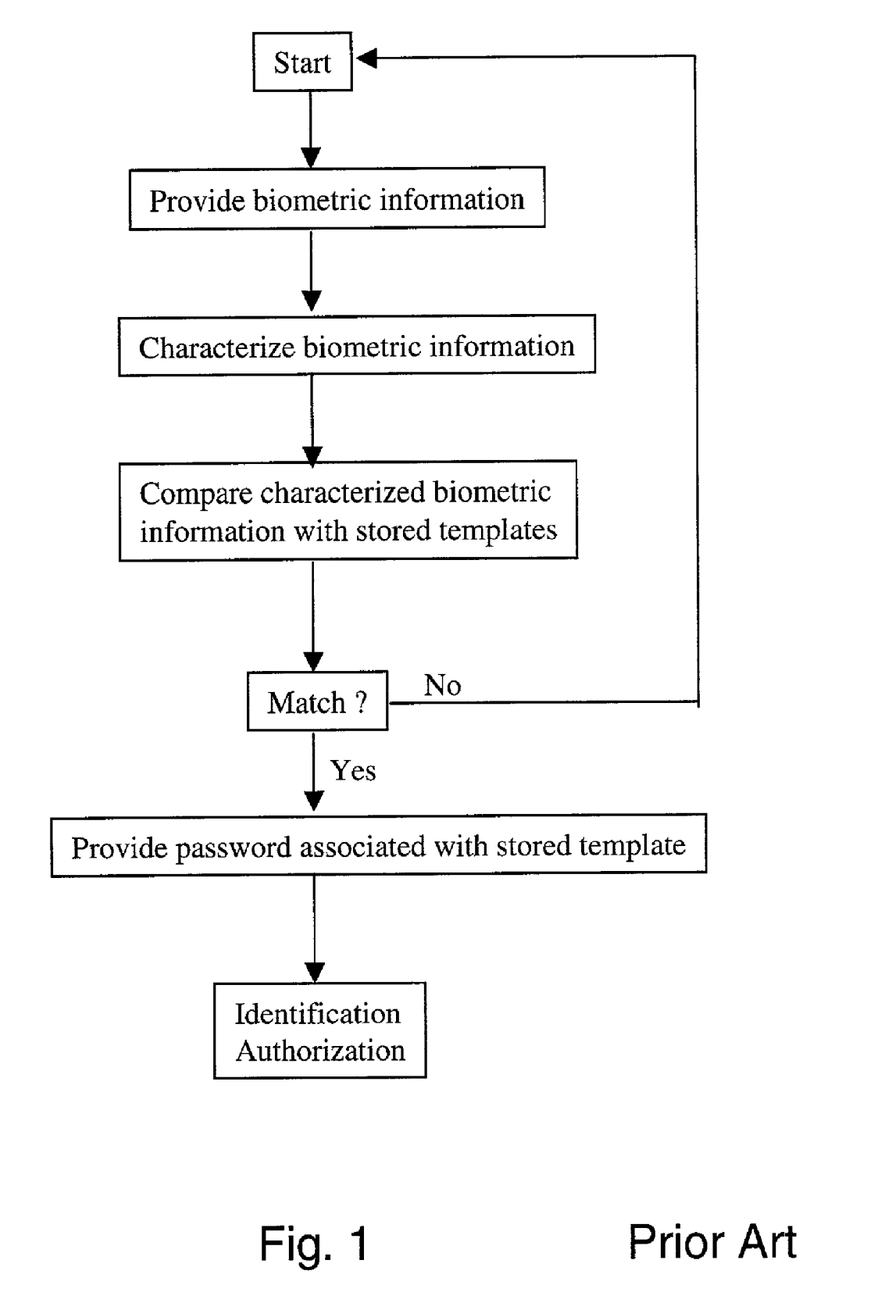
FIG. 1 is a flow diagram of a prior art method of associating a password to a fingerprint upon a match of a fingerprint with an associated template.

It is well known that a user determines a meaningful password, in the form of, for example, the name of their dog, the birth date of their child or an election year of the favorite candidate. This type of password is easily compromised with investigation. Conversely, a computer can randomly associates a password with a user, but this type of password is meaningless to the user and as such difficult to memorize. Consequently, the former method, which is simple, is insecure and the latter method, which is more secure, is difficult to use and often leads to a user writing their password next to their computer, thereby making the system insecure. A major advantage of using biometric information for retrieving a password is that the password does not have to be memorized. In the prior art is described many security systems involving imaging fingerprints to allow access to a building, to a specific area within a building, to a computer, etc. The security systems wherein biometric information is used for identifying and authorizing access to an individual mostly rely on a prior art method as shown in FIG. 1. After biometric information sample, in a form of a fingertip for example, has been provided to a system, the fingertip is imaged and the fingerprint is characterized. During the process of identification, the fingerprint is compared to stored templates associated with fingerprints of the person—for a one-to-one identification system—or of any person susceptible to access the system—in a one-to-many identification system. Upon a positive result of the comparison, when there is a match between the provided fingerprint and a stored template associated with a fingerprint, the system provides a password associated with the stored template and the user is identified and authorized. According to such a method, the system needs a certain amount of memory storage to store all the templates associated with fingerprints of the users. Thus, templates are stored giving rise to security concerns. Moreover, the system still relies on predetermined passwords. As such, a skilled person may find a predetermined password given sufficient time; though the system is more secure than those previously described, as soon as the predetermined password is found the system security is breached.

The fingers are subjected to many aggressions as for example cuts or burns that often occur in daily activities like cooking or manipulating sheets of paper. Therefore, an individual may have a temporarily loss of one or more features within their fingerprint because of an accidental scratch on the fingertip. In such a case, the image of the scratched, or burned fingertip will probably not match any stored template. That said, most template based fingerprint recognition systems, compensate for this problem in any of a number of known ways. In some instances the individual with the scratched fingerprint is not recognized and therefore not authorized. Of course, it is preferred that the individual is usually identified. It is known in the art that due to the nature of fingerprints reproducible extraction of passwords from fingerprint image data is difficult.

It is known that fingerprints present various features and the layout of the features is a random characteristic of a specific fingerprint. The principle of providing biometric information to a system is for a security purpose. Therefore, certain parameters are chosen to establish a desired level of security.

Figure 2:
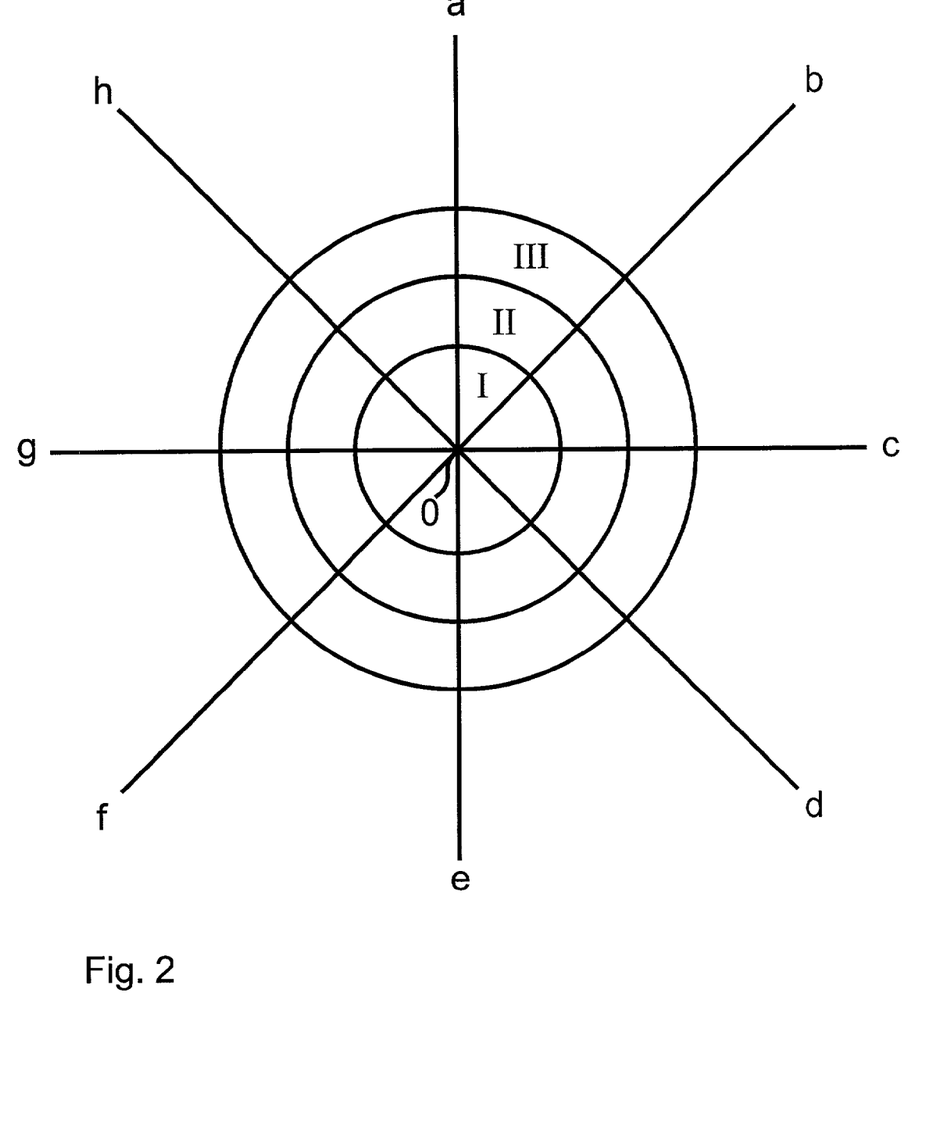
FIG. 2 is an illustration of a biometric imager platen divided in multiple cells.

Referring to FIG. 2, a platen of a biometric imager divided into 24 virtual cells is shown. As illustrated, the platen is divided in a target like fashion defining a two-dimensional surface. Four lines intersect at a same point 0 in such a way that each is separated from two adjacent lines by a same angle of 45°. As such drawn, the four lines define eight identical sections—two sections per quadrant. The intersection point 0 is also a center of three concentric circles that, in combination with the four lines, define 24 cells. Each cell is easily identified and an example of cell numbering is shown on FIG. 2. Advantageously, the identification of the cells is easily and efficiently encodable. The core of a fingerprint has a very unique form that is consistently recognized and identified to allow a match of the core of the fingerprint with the intersecting point 0 within predetermined limits. The method of generating a string from a fingerprint image and accommodating errors in core identification and variations in fingerprint placement is described hereinbelow.

Figure 3:
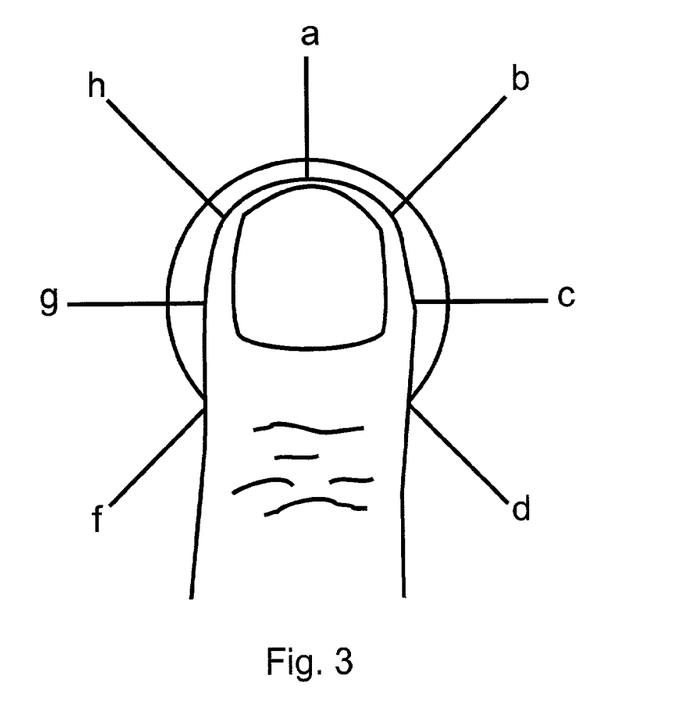
FIG. 3 is an illustration of a biometric imager platen divided in multiple cells having a fingertip thereon.

The target like division of the platen delineates different sectors within a single cell, and the sectors are not identically defined depending on the type of cell to which they pertain. The cells aI, bI, cI, dI, eI, fI, gI, hI, are approximately triangular with the particularity of having an accurate base; and the intersection of the two vertices is the point 0. The cells aI, bI, cI, dI, eI, fI, gI, hI, are approximately triangular with the particularity of having an arcuate base; and the intersection of the two vertices is the point 0. All the other cells have the same form bound by two parallel arcs and two radial lines. The size of the cells is different based upon the location of the cells in circle II or circle III. The presence of the lines that delineate each cell allows a sectorization of the cells as to sectors close to a radial line (right or left line of the cell), sectors close to a curved line (the small or the larger one), or a sector localized at a substantially central position far from any lines. The sectors are encodable as parameters by a processor, for example. The cells illustrated in FIG. 2 are then aligned with a core of fingerprint extracted from an image thereof. For example, when a fingertip is placed on the platen as shown in FIG. 3, the fingerprint is imaged and then the core is identified. The core is placed at point 0 or at another predetermined location relative to the point 0 and oriented at a predetermined angle relative to the cells. Therefore, characteristic features of the fingerprint fall within cells and sectors.

For encoding purposes, a symbol assignment representative of the system is performed. A symbol is characteristic of the location of an extracted feature within the biometric information and is characteristic of the type of the extracted feature. A symbol is defined as a value from a plurality of available symbols. Typically in decimal math systems the symbols {0, 1, 2, 3, 4, 5, 6, 7, 8, 9} are used. All numbers are represented by those symbols. Alternatively, in hexadecimal systems 16 symbols are used. In binary systems only 2 symbols are used. Here, each symbol or group of symbols is represented as an n bit value where n>0. An unordered password representative of the biometric information sample is generated by encoding more than one feature; the password comprises a combination of symbols.

Of course, though the platen is shown with a virtual target thereon, the virtual target is typically aligned with the fingerprint once a feature in the form of the core of the fingerprint is identified. As such, accurate and repeatable alignment of the virtual target pattern on the fingerprint, though not assured, is often achieved. Further, though reference is made to aligning a target, typically analysis merely extracts symbols indicative of feature location based on a known target configuration without actually aligning the virtual target or adding it to the image.

Figure 4A:
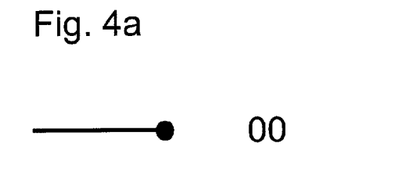
FIG. 4a–d are schematic illustrations of different types of key features of a fingerprint and an example of a possible code of the key features.
Figure 4B:
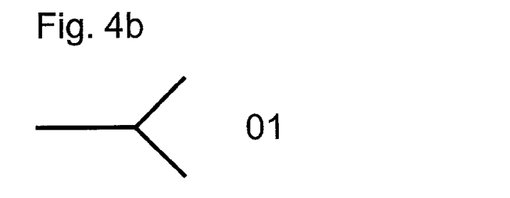
Figure 4C:
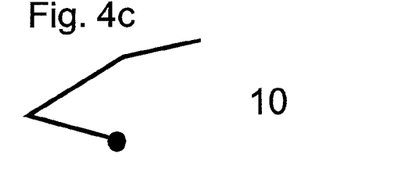
Figure 4D:
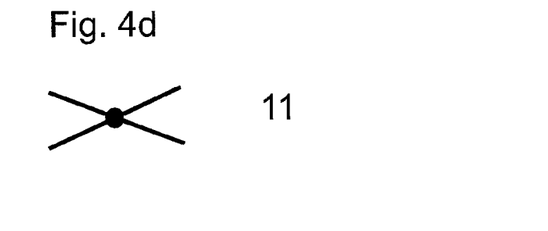

Referring to FIGS. 4a–d, schematic illustrations of different types of key features of a fingerprint and an example of a possible code for those key features is shown. The features are characterized and encoded by the processor according to a binary encoding system once the fingerprint is imaged. FIG. 4a shows a minutia that terminates and the code 00 associated with this type of minutia. FIGS. 4b–d present three other examples of fingerprint features with a binary code assigned to each key feature. Of course, the codes assigned to the key features of FIGS. 4a–d are for exemplary purposes only.

Figure 5A:
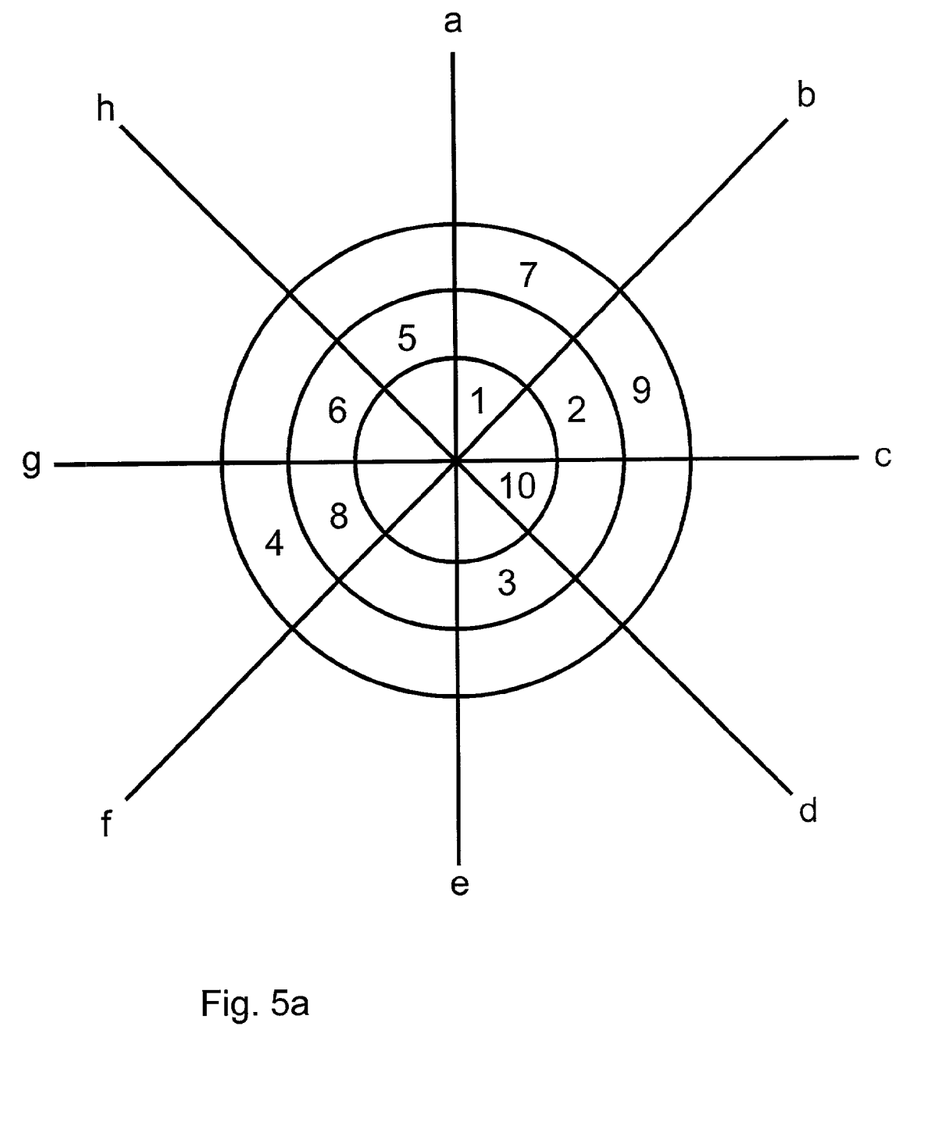
FIG. 5a is a representation of a possible distribution of key features of an imaged fingerprint.

Referring now to FIG. 5a, a representation of a possible distribution of key features of an imaged fingerprint is illustrated. To ease the reading of the drawings, the key features of a fingerprint are designated by Arabic numbers. In this example, the imager has recognized 10 key features and they are located in 10 different cells of the 24 cells. Each feature is identified by different parameters such as the code associated with the feature and the cell as defined in FIG. 2 wherein the feature is found. Table 1 shows the localization of the different features encountered in FIG. 5a.

TABLE 1

| Feature name | 1 | 2 | 3 | 4 | 5 | 6 | 7 | 8 | 9 | 10 |
|---|---|---|---|---|---|---|---|---|---|---|
| Cell | aI | bII | dIII | fIII | hII | gII | aIII | fII | bIII | CI |

If feature 1 is of the kind encoded as a 01 (see FIG. 4b), then the cell aI contains a 01 feature; each of the features is similarly characterized. The sector where a feature is localized in the cell once encoded forms a part of a string associated with the fingerprint.

Therefore, according to the different parameters for identifying and localizing a feature, the string for feature 1 might be for example: 01 0001 11011

Where:
  0 1 represents the type of feature,
  0 0 0 1 represents the identification of a location within a cell,
  1 1 0 1 1 represents the sector identification.

Of course, all of the ten features of the present example are similarly characterized. Interestingly, the string generation process of the key features of a fingerprint does not need to be an ordered process. However, the sequence of numbers characteristic of a feature is specific of the feature.

For explanatory purpose, the features in the examples are labeled with Arabic number that might imply sequencing in the string generation process. The features on a fingerprint are not numbered or labeled; therefore, the string generation process is unordered. Alternatively, ordering may occur for example by selecting features in order of their distance form the core or angular distance from a predetermined core angle.

It is known that a major problem associated with providing biometric samples in a form of fingerprints, is that the sample will be different from time to time. The fingertip is not exactly in the same position, i.e. it can be slightly moved in any direction: a slight translation in the right or left or front or back direction, a slight rotation of the fingertip and even a slight movement in the up or down direction. All the possible displacement of the fingertip on the platen leads to different imaging of a fingerprint because the features are not positioned at the same location as during the enrollment process. Also, the fingertip itself may vary depending on the properties of the skin, and the environmental conditions. The skin has elastic properties that allow a certain degree of flexibility either in an extending or in a constricting fashion. In cold temperature conditions, the blood circulation in the body extremities is reduced to maintain the body temperature, as such, the skin is slightly shrunk, conversely, in warmer temperature, the blood flow is increased and the skin is slightly stretched. Similarly, the stress might modify the blood flow and as such becomes a factor in the variation of the fingertips. Therefore, core extraction may result in small errors in core identification and orientation. These errors will in turn lead to variations in the encoded values determined from a fingerprint that is imaged.

Figure 5B:
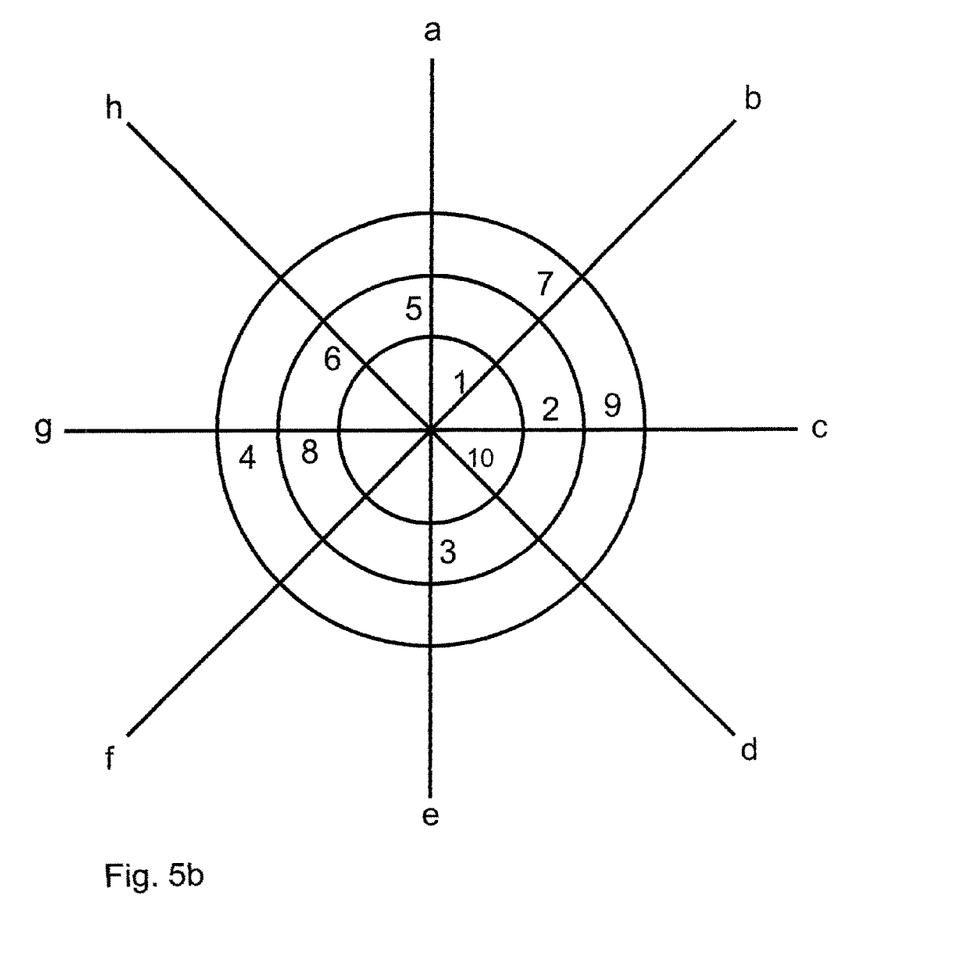
FIG. 5b is a representation of the distribution of key features of the fingerprint of FIG. 5a imaged in a different position.

The features, as they are shown in FIG. 5a, are localized in sectors substantially central in the cells; this means that none of the feature in this example is close to a line delineating a cell border. In FIG. 5b is shown an illustration having a slight displacement of the fingertip of FIG. 5a on the platen of the imager relative to that of FIG. 5a. In FIG. 5b, the fingertip has rotated counterclockwise slightly. All the features remain in their respective cells as compared to the pattern of FIG. 5a; however, two of them, features 1 and 10 have moved from a substantially central sector to a sector close to the right straight line or vertices of the triangle of the cell. Therefore, the sector codes for features 1 and 10 are different from the codes encountered previously for the fingerprint sample of FIG. 5a but codes for the type of feature and the cell are identical.

In order to render the string extraction operation more robust, among the parameters are a certain number of features that are permitably absent during the identification and string generation process, and a determined number of features have to be identified and properly encoded for acceptance. Thus, if the first number is for example settled at two, and the second one set at 8, the programming of the processor will reflect such a choice and therefore, ten features are considered with a margin of error of two so that even if two features are not properly encoded within the string, but eight are, security level requirements are met allowing for proper string evaluation.

Figure 6A:
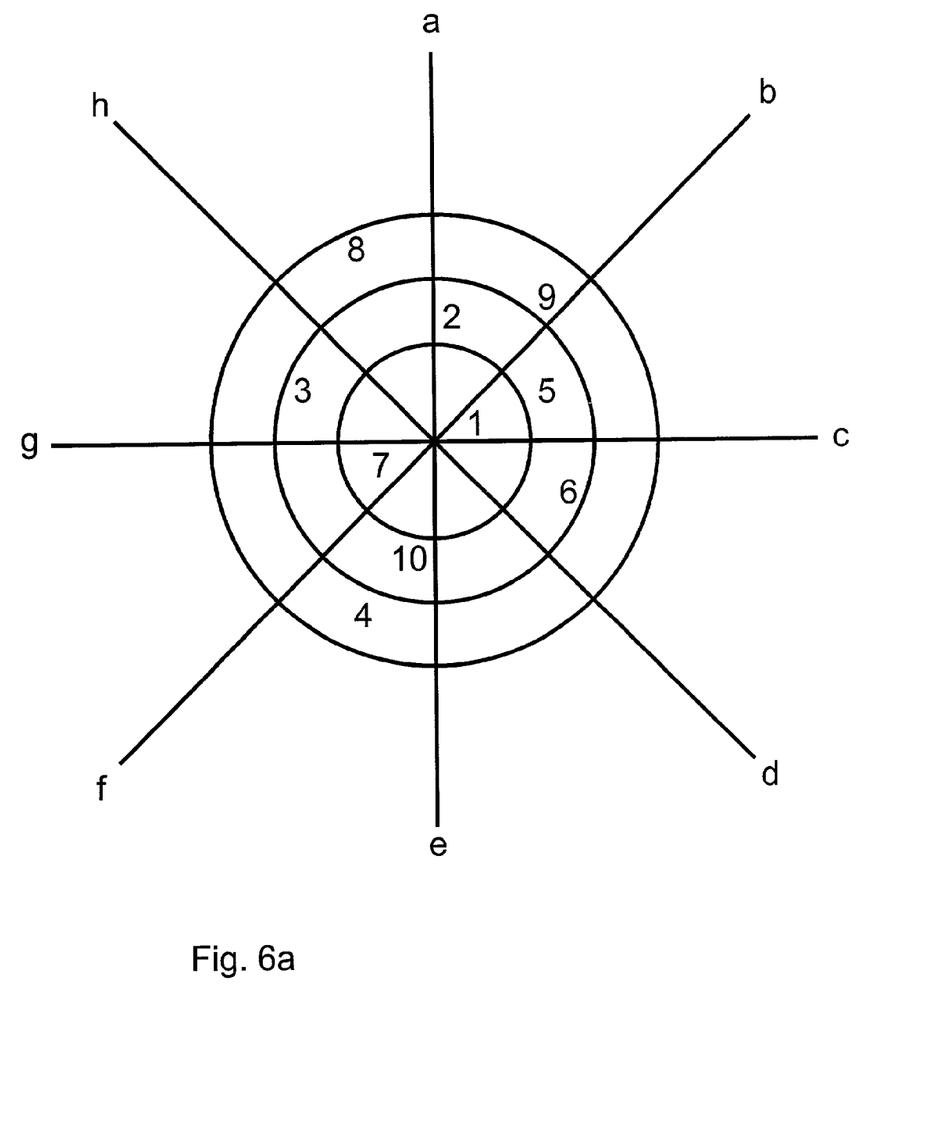
FIG. 6a is a representation of a possible distribution of key features of an imaged fingerprint.
Figure 6B:
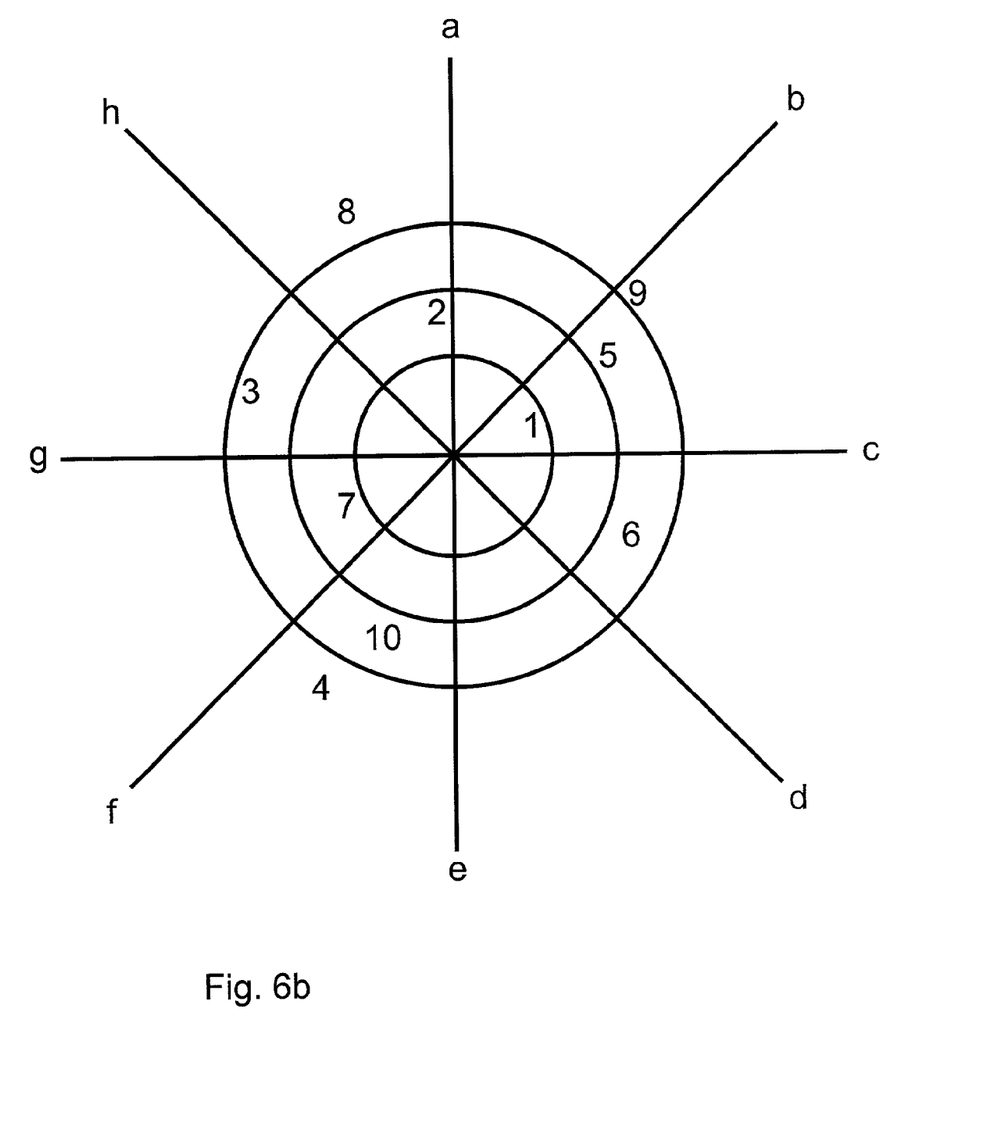
FIG. 6b is a representation of the distribution of key features of the fingerprint of FIG. 6a imaged in a different position.

Referring to FIG. 6a, a representation of a further example of a possible distribution of key features of an imaged fingerprint is shown. In the present example, ten key features are spread in ten different cells. As previously described, the key features are encoded to form a string, each encoded symbol being representative of the type of the key feature, the cell and the sector where the key feature is encountered on the virtual platen. FIG. 6b is a representation of the distribution of key features of the fingerprint of FIG. 6a imaged in different conditions. In FIG. 6b, the individual has applied more pressure to his finger. The presence of soft tissues at the fingertip allows a slight change of form in accordance with the pressure applied to mimic the surface it is pressed on. Here, the surface of the platen being substantially flat, the fingertip become temporarily substantially flat too when it is in contact with the platen. Consequently, the key features are further out as illustrated in exaggerated form in FIG. 6b.

Table 2 shows the cell location of the key features as illustrated in FIG. 6a.

| Feature name | 1 | 2 | 3 | 4 | 5 | 6 | 7 | 8 | 9 | 10 |
|---|---|---|---|---|---|---|---|---|---|---|
| Cell | bI | aII | gII | eIII | bII | cII | fI | hIII | aIII | EII |

Table 3 shows the cell location of the key features as illustrated in FIG. 6b. The stars indicate the difference of location of features between the fingerprints imaged in FIG. 6a and FIG. 6b.

| Feature name | 1 | 2 | 3 | 4 | 5 | 6 | 7 | 8 | 9 | 10 |
|---|---|---|---|---|---|---|---|---|---|---|
| Cell | bI | hII | gIII | eIV | bIII | cIII | fII | hIV | bIV | eIII |
| Comparison table 2/table 3 |  | * | * | * | * | * | * | * | * | * |

Figure 7:
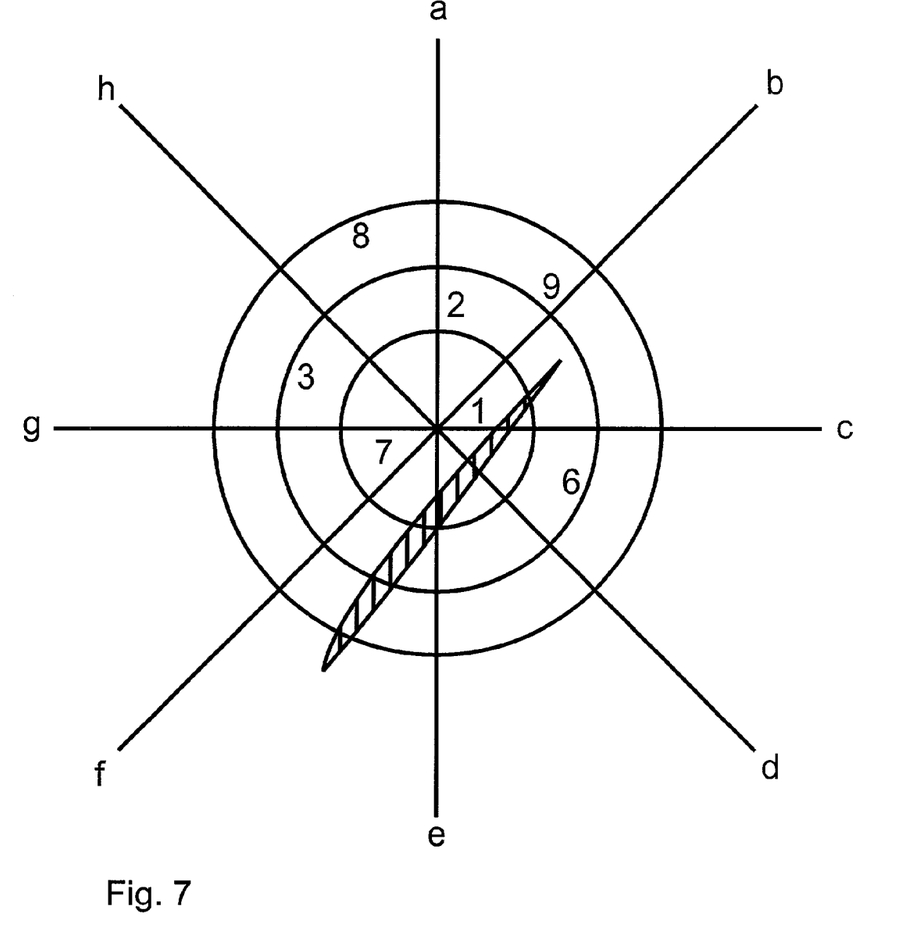
FIG. 7 is a representation of the distribution of key features of the fingerprint of FIG. 6a wherein the fingerprint shows a scratch.

Referring now to FIG. 7, a representation of the distribution of key features of the fingerprint of FIG. 6a wherein the fingerprint exhibits a scratch is shown. The scratch is illustrated as a hatched strip in the figure. Comparing the pattern of distribution of the key features between FIG. 6a and FIG. 7, it is clear that the three key features 4, 5 and 10 are missing in FIG. 7. Thus, it is important that the number of features that can be absent during the identification and string generation process reflects that an accident may occur to someone and that a person may have a temporary loss of one or more key features. Of course, security concerns are typically paramount and should also be considered. However, in the present case, if the number of key feature that can be absent during the identification and string generation process was set at two, and the number of key features that have to be identified and properly encoded for acceptance is set at eight, the individual with the scratched fingertip is not identifiable. Indeed, seven key features out of eight are identified and properly encoded which is insufficient.

In order to overcome this problem, a fingerprint is typically encoded with "spare" features or additional features for use when a feature is missing or is deleted. Thus, for example, 12 features are encoded as symbols—ten features for string generation and two replacement features. In extracting a string from a fingerprint image, ten of the features are typically assembled into a string for comparison with the previously stored string. When other than matching, the two spare features are used to replace features within the string and comparison is repeated. Of course, this method is best applied to absent features when they are identifiable, as that is not uncommon when fingertip damage has occurred. It is preferable not to apply this same technique to erroneous features—wrong feature type for example. Of course, for higher security applications, it is sometimes desirable to not encode any spare features.

Figure 9:
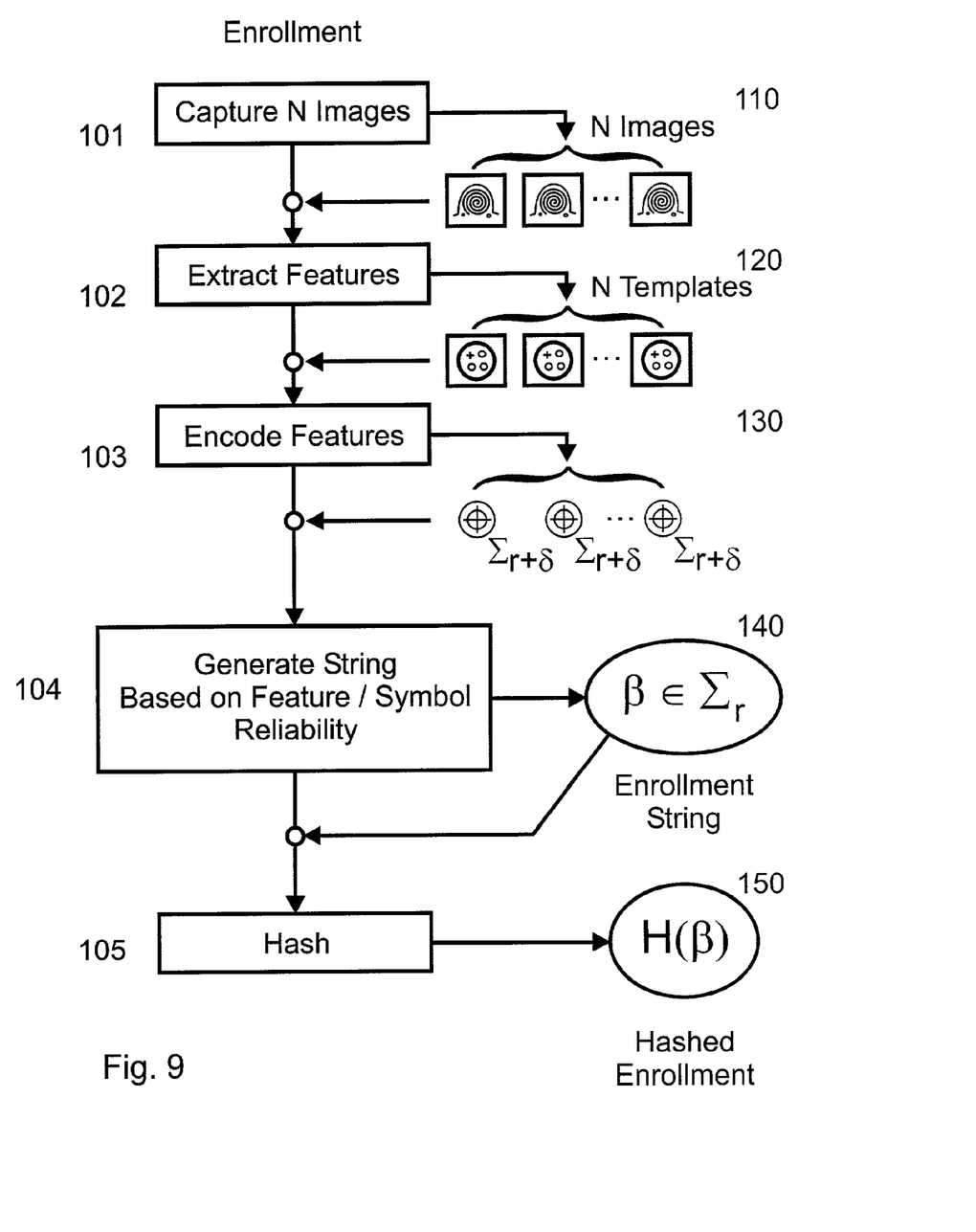
FIG. 9 is a flow diagram representing a method of hash string extraction from biometric information for an enrollment procedure according to the present invention.

Of note, when features are described as missing or absent, this refers to their absence from the fingerprint itself. No comparison of present or absent features is performed on the fingerprint. A predetermined number of features is located and encoded. The encoded values are provided as one of an unordered and an ordered string to a string comparison unit such as a password verification unit. The string is then verified in a fashion similar to verification of a password. Differences from password verification are notable when provision is made for feature absence as described above. Here, a number of potentially correct passwords exist—each reflecting deletion of one or more features and replacement thereof with other features. Thus, the string might need to be compared against several strings to determine user authorization. Of course, set out below with reference to FIG. 9 is a method of limiting string comparisons to one string.

When fingerprint features are permitted to move relative to the cells, this is typically performed by generating a plurality of possible strings for comparison as noted above. Alternatively, string symbols are masked when possible to reflect possible differences therebetween. This has the advantage that it permits easy modification of permitted variations in string symbol encoding.

Depending on the depth of the injury that has led to a temporarily loss of key features, the skin may heal and regenerate so that the lost key features are replaced by identical original key features without causing further trouble. However, the skin may scar, thereby altering the fingerprint key features forcing an individual to go through another string generation procedure to generate a string against which future strings will be compared.

The encoding of the key features of a fingerprint, the encoding of the location of the key features in virtual cells, independent of the form of the cells, and the encoding or quantization of sector location within the cells, is achieved by a processor according to a process for string extraction from biometric information that relies on various parameters and mathematical formulas for mathematically encoding the string.

An exemplary set of parameters is set out below providing adequate security and flexibility for many applications.

Parameters:

$$\sum = \text{def Alphabet of symbols,}$$

$$\sum{}^* = \text{def set of all canonical (ordered symbols) strings}$$

$$\sum_r = \text{def} \left\{ \alpha \in \sum{}^r \mid \|\alpha\| = r \right\} \text{set of strings of length } r$$

N=number of enrollment samples;

r=number of "key" features encoded for key;

δ=number of extra key features encoded to allow for δ deletions (absent features);

ε=number of quantization errors tolerated (shifts in sector/cell location);

κ=number of re-quantization possibilities,
  e.g. 3=one rotation left, right or identity,
  or 3=one translation up, down or identity, $$\text{or } 9 = \begin{array}{|c|c|c|} \hline + & + & + \\ \hline + & 0 & + \\ \hline + & + & + \\ \hline \end{array}$$

or 9×2−1=above coupled with minutia type flipping.

Figure 8:
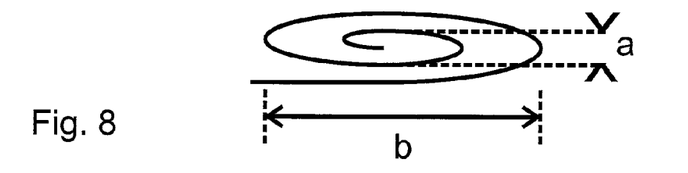
FIG. 8 is an enlarged representation of a potential core of a fingerprint.

N is a number of enrollment samples for use in determining a feature set including disregarding any features that are erroneously identified. A larger number N is preferred for string generation but the larger the value of N the less convenient the system is to operate.

r allows a system administrator to set a number of features for generation of a string. Of course, increased features results in longer strings, which are therefore more secure. Alternatively, more features may result in more dubious features being extracted rendering the system less reliable. Therefore, a compromise between a lot of features for enhanced security and fewer features for increased reliability is typically achieved.

δ is a number of additional symbols to generate relating to additional features. Thus, if a feature is missing from a presented biometric information sample, the feature is replaceable with one of the extra features to form a string of the same length.

ε E is a number of permitted quantisation errors. The quantisation relates to quantisation of feature location within cells. As such, exact feature locations are not determined and instead, feature locations are quantised into one of a number of cells and sectors. How far off each feature can be is determined from the value K but how many errors are permitted is determined from this value.

κ, the number of re-quantization possibilities, gives a certain level of flexibility to the string comparison procedure. If for example a core of a fingerprint has an elongated form as illustrated in FIG. 8, the processor is most probably able to identify the transversal part "a" and to recognize the core of the fingerprint because of this identification. However, the form of the core is such that the longitudinal part "b" is more difficult to identify. Therefore, it is possible to authorize lateral error, in the present case, so that an error of alignment to the left or right side is tolerated and the core is recognized. Of course, the lateral error permitted for the core recognition is tolerated for each feature. Then the string generated for each feature takes into account that potential lateral error. The error may be authorized in one or more of the directions, i.e. to the side, up and down, and diagonal directions; the flexibility may be extended to a combination of directions and even to all the directions at the same time. Though this considerably increases string acceptance and therefore decreases security, it is easy enough to ensure that all errors are consistent one with another and, therefore, to maintain the security level high.

For example, if quantisation error is allowed in all directions, it does not mean that each symbol should be recognized as accurate regardless of the quantisation error. In some cases, it is preferred that each quantisation error is the same. This same quantisation error is for example represented by a shift of the fingerprint in a lateral direction resulting a same shift for each encoded symbol, a shift in the fingerprint by a rotational angle resulting in a consistent shift for each symbol about the core or an increased or decreased pressure by a fingertip resulting in, once again, a consistent shift of features toward or away from the core.

Of course, with other variables the permutations and values above are different. Also, it is possible to render an ordered list of symbols or an unordered list resulting in different false acceptance rates and false rejection rates. Design requirements are typically used to determine the selected parameters and possible value ranges for each. Thus, with a proper model for the system, it is straightforward to determine from the model maximum and minimum values for each parameter in order to maintain security and maximize user convenience.

Referring now to FIG. 9, a method for generating a hashed enrollment value is shown. The left side of the figure represents a flow diagram illustrating the different steps of the enrollment procedure, whereas the right side of the figure is a more visual representation of the procedure at each related step. A biometric information sample, in the form of a fingerprint for example, is provided to a system. In order to generate a hashed enrollment value, at a step 101, the system captures N images 110 of the fingerprint. The N images 110 of the fingerprint are analyzed in order to extract features at a step 102. The system creates N templates 120 associated to the extracted features from the N images. Within each template from the N templates 120, in a further step 103 the extracted features are characterized and encoded by the processor according to a predetermined encoding system, as for example a binary, a decimal or any other convenient encoding system. Encoding the extracted features results in N templates of encoded features $\Sigma_{(r+\delta)}$ 130 associated to the N templates 120, $\Sigma_{(r+\delta)}$ being the number of possible substrings of length r. Step 104 involves generating an unordered enrollment string $\beta \in \Sigma_r$ 140 based on the feature/symbol reliability of the extracted features within the templates; The unordered enrollment string is part of an error ball $\Sigma_r$ which is a set of strings of symbols of length r that are consistent with the enrollment templates and the parameters. In a final step 105, the unordered enrollment string is hashed providing a hashed enrollment value $H(\beta)$ 150. Typically, the hashed enrollment value is generated using a one-way hashing algorithm so as to prevent determination of the string from the hash value. This allows storage of the hash value on the client system and on the server system without risking breaches of security by those data mining those systems. In order to accurately authenticate to the server system, the string from which the hash is derived must be provided. Therefore, the fingerprint from which the string is generated is typically necessary unless, for example, a Trojan horse is used to intercept the string at an earlier time.

Figure 10:
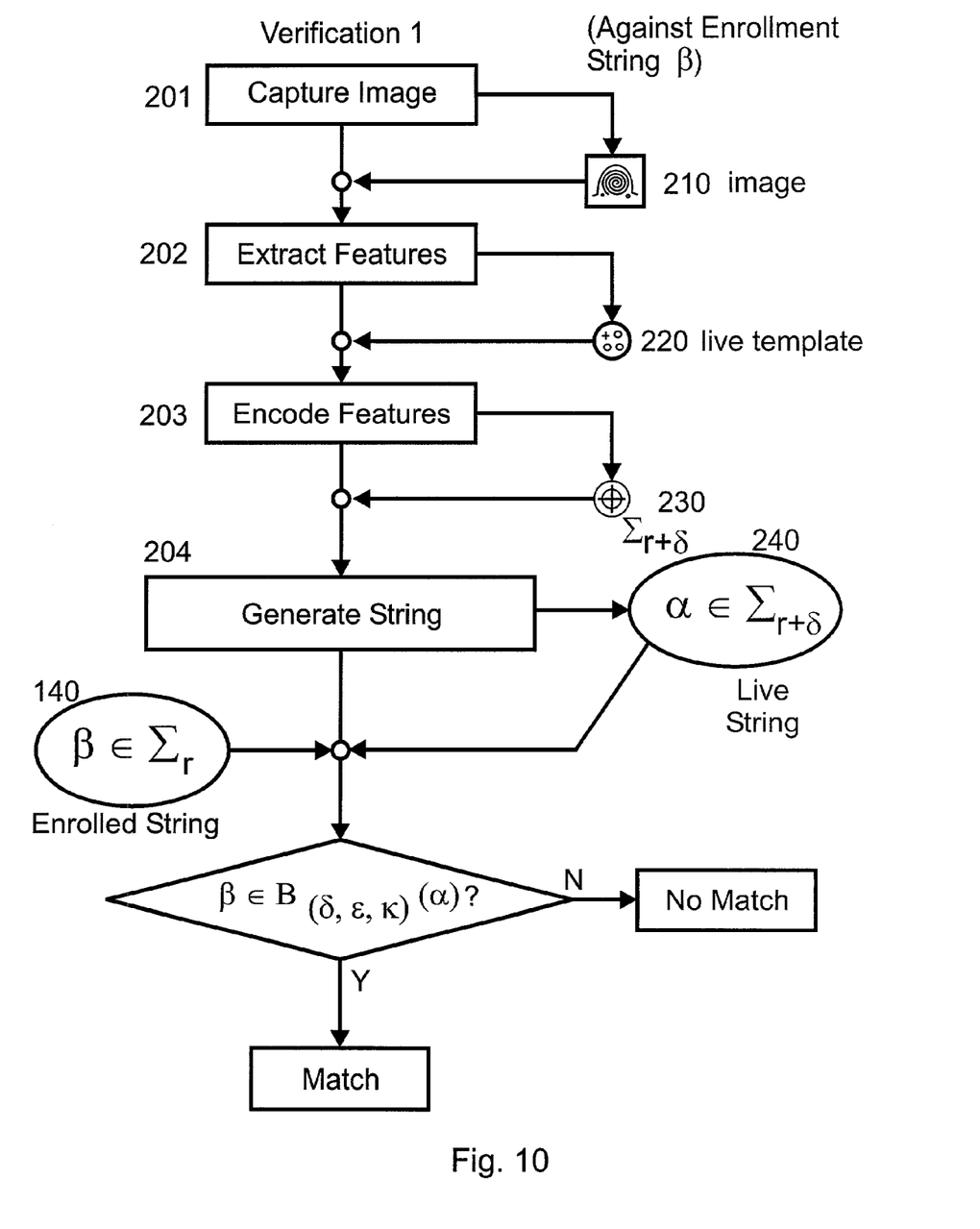
FIG. 10 is a flow diagram illustrative of an authentication process according to the present invention; and, FIG. 11 is a flow diagram illustrative of a further authentication process according to the present invention.

Referring to FIG. 10, a first method of authentication is shown wherein a string generated from a fingerprint is provided as a password for verification, authentication and/or identification. The left side of the figure represents a flow diagram illustrating the different steps of the verification process, whereas the right side of the figure is a more visual representation of the process at each related step. A user to be identified and/or authorized provides a biometric sample in the form of a fingerprint, at a step 201, the system captures an image 210 of the provided fingerprint. At step 202, the system extracts features from the captured image and generates a live template 220 of the extracted features for encoding them in the following step 203. Encoding the extracted features results in a template of encoded features $\Sigma_{(r+\delta)}$ 230 associated with the live template. The template may also be viewed as an ordered or unordered group of features and their characteristics. In step 204, unordered strings corresponding to live strings $\alpha \in \Sigma_{(r+\delta)}$ 240 are generated. Each live string is then compared to the enrollment string 140 in order to authorize and/or identify the user. Of course, each string is provided in a method similar to provision of a password so the process may require repetition of a password verification process several times.

Figure 11:
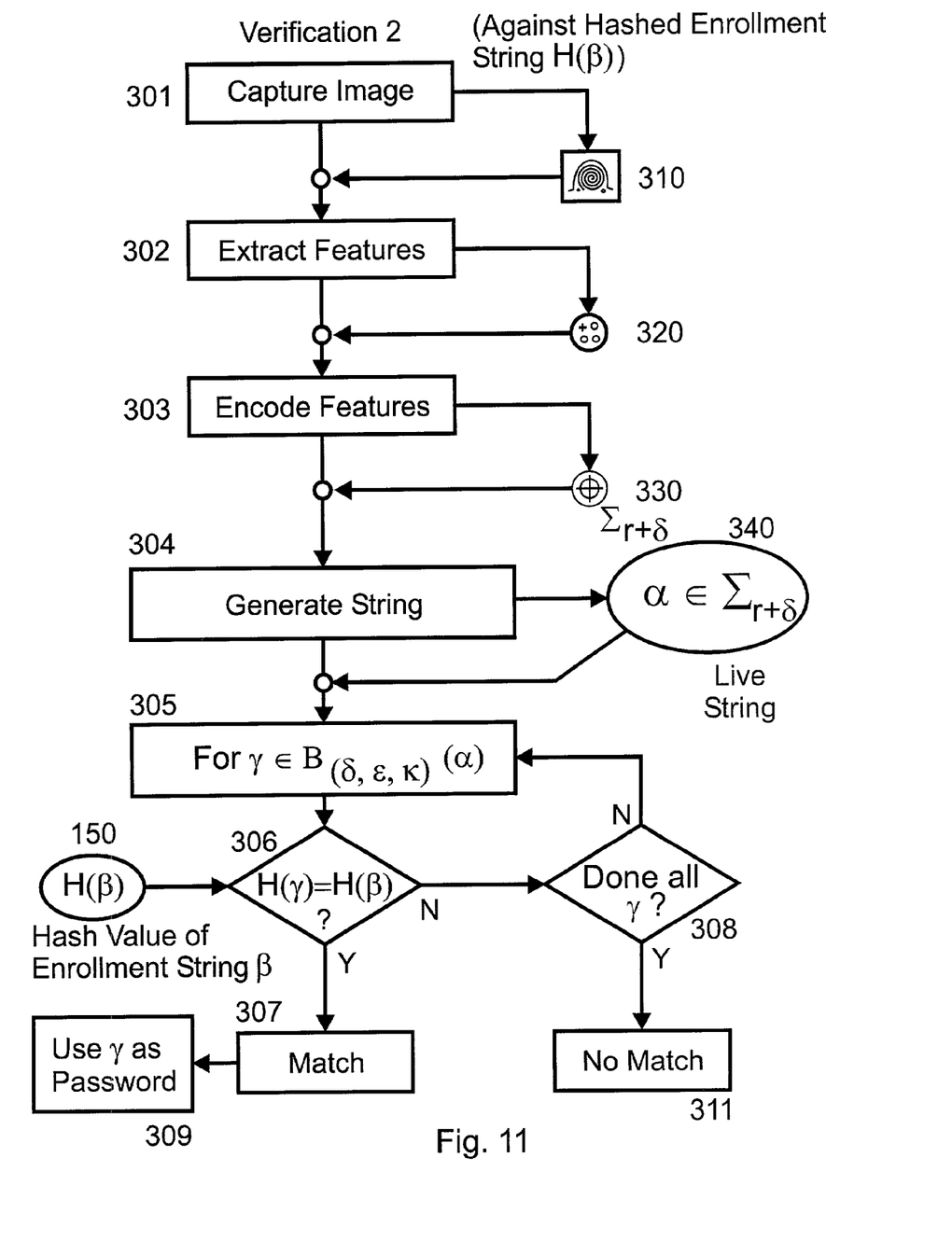

Referring now to FIG. 1, a second method of authentication is shown wherein only a single extracted string is provided to a password verification process. Such a system maintains maximum compatibility with legacy systems. The left side of the figure represents a flow diagram illustrating the different steps of the verification process, whereas the right side of the figure is a more visual representation of the process at each related step. A user to be identified and/or authorized provides a biometric sample in the form of a fingerprint, at a step 301, the system captures an image 310 of the provided fingerprint. At step 302, the system extracts features from the captured image and generates a live template 320 of the extracted features for encoding them in the following step 303. Encoding the extracted features results in a template of encoded features $\Sigma_{(r+\delta)}$ 330 associated to the live template. In step 304 an unordered string corresponding to live string $\alpha \in \Sigma_{(r+\delta)}$ 340 is generated. In the further step 305, the processor determines all the possible strings of symbols $\gamma \in B_{(\delta,\epsilon,\kappa)}(\alpha)$ associated with $\alpha$ according to predetermined parameters of the system. This means that all the possible strings of symbols $\gamma$ taking into account the number $\delta$ of deletions allowed, the number $\epsilon$ of permitted quantisation errors, and the number $\kappa$ of re-quantization possibilities. This total set of strings is termed the error ball as it is generally a region about the determined string.

At the step 306, the strings of symbols $\gamma$ are hashed and compared to the hash value derived from the correct enrollment string $\beta$. Upon the result of the comparison, when $H(\gamma)=H(\beta)$, there is a match 307 between the hash value of enrollment string $\beta$ and the hash value of string of symbols generated from the live string $\alpha$, therefore, $\gamma$ is used as a password 309 and access is authorized to the user. This allows for provision of only a single string extracted from a fingerprint as the correct password instead of requiring every possible string within the error ball to ensure authorization.

On the contrary, $H(\gamma)$ other than equal to $H(\beta)$, might indicate, as shown at step 308, that the processor has not generated all the strings of symbols $\gamma$. In such a case, the system returns to step 305. However, in the case where all the strings of symbols $\gamma$ have been generated, if $H(\gamma)$ is other than equal to $H(\beta)$ indicates that there is no match 311 between the hash value of enrollment string $\beta$ and the string of symbols generated from a live string $\alpha$, therefore, access is denied to the user or the user is prompted to provide another different biometric sample.

False Acceptance Rate (FAR) calculation according to the method:

For $\beta \in \Sigma_{r+\delta}$, the number of possible substrings of $\beta$ of length r is at most:

$$\binom{r+\delta}{r}$$

If $\epsilon$ quantization (substitution) errors corrections of a string $\epsilon \in \Sigma_r$ are allowed, each $\kappa$ possible substitutions, the number of such corrected string is:

$$\binom{r}{\epsilon}\kappa^\epsilon$$

For $\beta \in \Sigma_r$, $B_{(\epsilon,\kappa)}(\beta) =_{Def} \{\epsilon \in \Sigma_r | \alpha$ is a string consisting of $\epsilon$ substitution corrections, each with $\kappa$ possible substitutions$\}$, and wherein $B_{(\epsilon,\kappa)}$ is representative of an error ball around $\beta$.

For $\beta \in \Sigma_{r+\delta}$, $B_{(\delta,\epsilon,\kappa)}(\beta) =_{Def} \{\epsilon \in \Sigma_r | \alpha \in B_{(\epsilon,\kappa)}(\beta^*)$, where $\beta^*$ is a substring of $\beta$ obtained by deleting $\delta$ symbols from $\beta\}$, wherein $B_{(\epsilon,\kappa)}$ represents the error correction space (ball) of $\beta \in \Sigma_{r+\delta}$ consisting of $\delta$ deletions and $\epsilon$ substitutions of K possible substitution values;

and wherein $B_{(\delta,\epsilon,\kappa)}(\beta)$ represents the set of all strings that are corrections of $\beta$ by applying $\delta$ deletions and $\epsilon$ substitutions, each with K possible substitution values.

$$|B_{(\delta,\epsilon,\kappa)}(\beta)| = \binom{r+\delta}{r}\binom{r}{\epsilon}\kappa^\epsilon$$

The number of canonical strings of length r is $Occ(r,|\Sigma|)$ $$\Rightarrow FAR = P(\alpha \in B_{(\delta,\epsilon,\kappa)}(\beta)) = \frac{|B_{(\delta,\epsilon,\kappa)}(\beta)|}{Occ(r,|\Sigma|)}$$

=the probability that a random string $\epsilon \in \Sigma_r$ is in the error correction space of $\beta \in \Sigma_{r+\delta}$ In accordance with another embodiment of the invention, an individual is prompted to select an alignment feature for use in feature extraction and symbol generation. For example, a list of extracted features in different areas of the fingerprint and each repeatably and reliably extractable is provided to the user. The user then selects the alignment feature and the string is generated based thereon. Such a method adds a component of user knowledge to the password generation step allowing for additional security and allowing the user to change their password when so desired.

In another similar embodiment, the user merely selects a location within their biometric information sample and the location is used to deterministically select an alignment feature. Alternatively, a password is used to deterministically select the alignment feature. For example, the password is hashed into a number and the number is used to select between alignment feature extraction and alignment methodologies. If the methods result in slightly different results, this is often sufficient to dramatically change the extracted string value.

Numerous other embodiments may be envisaged without departing from the spirit and scope of the invention. For example, the platen of the fingerprint imager could be a 3D platen as for example a curved platen. Furthermore, the platen has been described to be artificially divided in a target-like fashion, and of course, any other pattern would be conceivable as for example a grid or honeycomb pattern where each parallelepiped delineate a cell that defines sectors.

What is claimed is:

1. A method of password generation comprising:
   providing a biometric information sample;
   determining from the sample a first string including a plurality of symbols, the symbols based on features within the biometric information sample;
   determining a plurality of strings in dependence upon predetermined characteristics in relation to the first string;
   hashing the strings from the determined plurality of strings to produce a plurality of hash values; and
   comparing each hash value from the plurality of hash values against a stored hash value determined during an enrollment process for determining at least one hash string from the plurality of hash strings indicative of a match,
   wherein upon a match between a hash value from the plurality of hash values and the stored hash value, the string from the plurality of strings and associated with the matching hash value is provided as the generated password.

2. A method of password generation according to claim 1 wherein the first string is ordered based upon its symbol content.

3. A method of password generation according to claim 2 wherein the strings from the plurality of strings are ordered based upon their symbol content.

4. A method of password generation according to claim 1 wherein determining a plurality of strings in dependence upon predetermined characteristics comprises:
   capturing an image of a biometric information sample from a biometric information source;
   extracting a number r of features from the biometric information sample and encoding r symbols, one per feature; and,
   extracting a number $\delta$ of extra features, and encoding $\delta$ extra symbols, one per extra feature, and
   wherein comparing the string includes determining a number of symbols within the string that are absent from the previously stored string and deleting those symbols.

5. A method of password generation according to claim 1 wherein upon the comparison of each hash value from the plurality of hash values against a stored hash value determined during an enrollment process is indicative of other than at least one hash string from the plurality of hash strings matches, verifying if the plurality of hash strings includes all the hash strings that can be generated within predetermined characteristics.

6. A method of password generation according to claim 1 wherein the generated password is an unordered generated password.

7. A method of password generation according to claim 1 comprising determining at least a feature type of features within the biometric information sample and encoding symbols from the plurality of symbols in dependence upon the determined feature type.

8. A method of password generation according to claim 1 wherein a symbol is encoded as an n-bit value.

9. A method of password generation comprising:
   providing a biometric information sample from an individual;
   determining a location of an alignment feature within the biometric information sample;
   extracting features from the biometric information sample;
   determining from the extracted features a first string of symbols based on locations of extracted features within the biometric information sample relative to the alignment feature;
   determining a plurality of error strings in dependence upon predetermined parameters defining an error region about the extracted first string;
   hashing the first string and at least some of the error strings from the determined plurality of strings to produce a plurality of hash values; and comparing each produced hash value from the plurality of hash values with a predetermined stored hash value for determining a hash value from the plurality of hash values indicative of a match, wherein upon a match between a hash value from the plurality of hash values and the stored hash value, the string from which the matching hash value was derived is provided as the generated password.

10. A method of password generation according to claim 9 comprising: providing an indication of the alignment feature.

11. A method of password generation according to claim 10 wherein providing an indication of the alignment feature includes selecting the alignment feature from a plurality of alignment features.

12. A method of password generation according to claim 10 wherein providing an indication of the alignment feature includes selecting a region within the biometric information sample, the region being indicative of alignment feature from a plurality of potential alignment features.

* * * * *